Nov. 20, 1951     M. A. TOWNSEND     2,575,370
COLD CATHODE GASEOUS DISCHARGE DEVICE
Filed June 25, 1949     4 Sheets—Sheet 1

INVENTOR
M. A. TOWNSEND
BY
ATTORNEY

Nov. 20, 1951 — M. A. TOWNSEND — 2,575,370
COLD CATHODE GASEOUS DISCHARGE DEVICE
Filed June 25, 1949 — 4 Sheets-Sheet 2

INVENTOR
M. A. TOWNSEND
BY
ATTORNEY

Nov. 20, 1951 M. A. TOWNSEND 2,575,370
COLD CATHODE GASEOUS DISCHARGE DEVICE
Filed June 25, 1949 4 Sheets-Sheet 3
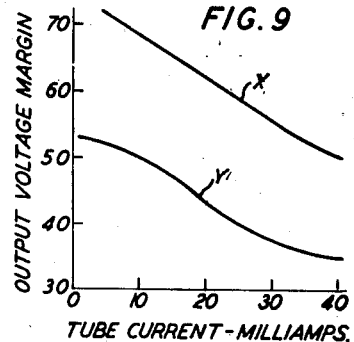
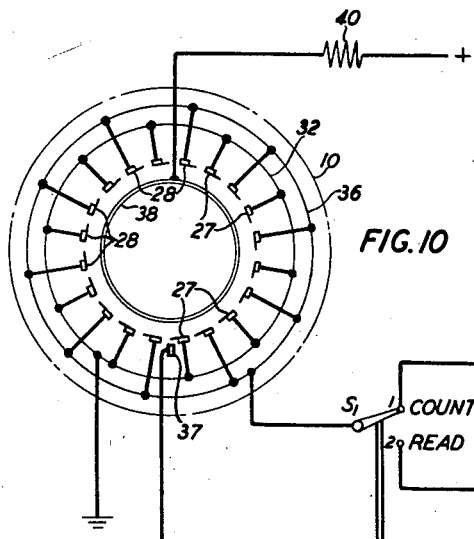
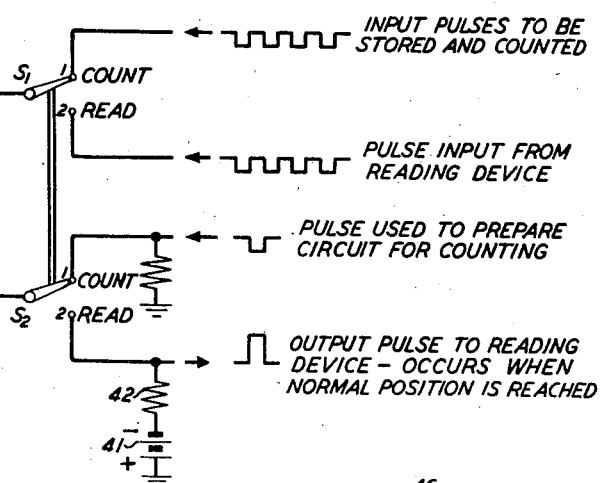
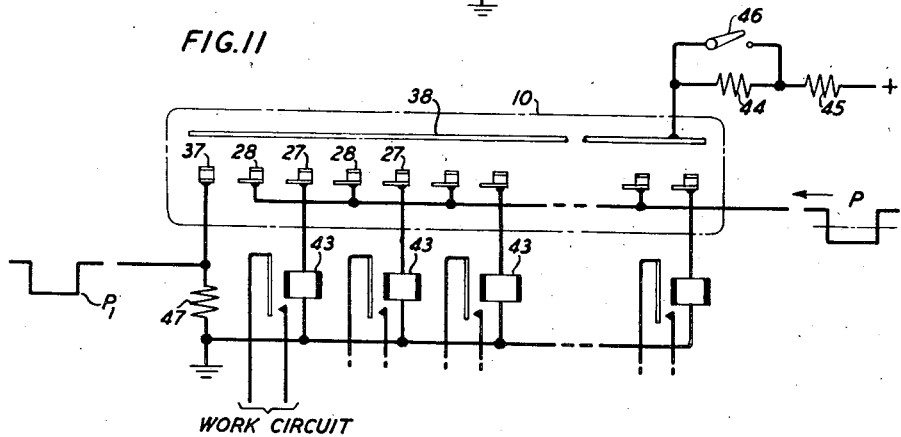
INVENTOR
M. A. TOWNSEND
BY
ATTORNEY Nov. 20, 1951 — M. A. TOWNSEND — 2,575,370
COLD CATHODE GASEOUS DISCHARGE DEVICE
Filed June 25, 1949

INVENTOR
M. A. TOWNSEND
BY
ATTORNEY

Patented Nov. 20, 1951

2,575,370

UNITED STATES PATENT OFFICE 2,575,370

COLD CATHODE GASEOUS DISCHARGE DEVICE

Mark A. Townsend, Murray Hill, N. J., assignor to Bell Telephone Laboratories, Incorporated, New York, N. Y., a corporation of New York Application June 25, 1949, Serial No. 101,322

34 Claims. (Cl. 313—188)

This invention relates to electric discharge devices and more particularly to multiple cold cathode glow discharge devices particularly suitable for use in pulse counting or switching apparatus and systems.

One general object of this invention is to improve the structure and performance characteristics of multiple element gaseous discharge devices.

More specifically, objects of this invention are to simplify electronic stepping or switching apparatus and systems, facilitate the rapid switching of the discharge in a glow discharge device to any one of a number of different paths, assure stepping of a discharge in such devices in only one preassigned direction along a multiplicity of discharge paths, reduce the number of connections requisite in a multiple cold cathode glow discharge device to produce shifting of the discharge in a preassigned manner from one cathode to another, expedite the counting of a series of signal pulses, simplify equipment necessary to effect such counting, and enable the performance of a variety of electrical operations with a multiple element glow discharge having a relatively small number of electrodes and connections thereto.

In one illustrative embodiment of this invention, a gaseous discharge device comprises an anode and a plurality of cold cathodes in cooperative relation with the anode, the cathodes being mounted in a row which may be rectilinear, circular or of other geometrical form.

In accordance with one feature of this invention, the cathodes or certain of them are electrically grouped and are so constructed and arranged that the discharge between one cathode and the anode may be stepped or shifted selectively to a path between the anode and another cathode in response to signal pulses, the discharge shifting or advancing one position for each pulse.

In accordance with another feature of this invention, the several cathodes are so constructed and are so arranged relative to one another that the discharge at any cathode concentrates at a prescribed region thereof and is effective to assure transfer of the discharge in only a preassigned direction to another cathode in response to a signal pulse applied to the device. Specifically, in one embodiment, the cathode construction and arrangement is such that the discharge can shift only from one cathode to the next succeeding cathode in the row.

In accordance with a further feature of this invention, means are provided whereby the discharge may be reset to obtain at a preassigned cathode from any other cathode in the row.

In accordance with a still further feature of this invention, the cathodes are constructed and electrically grouped so that the number of circuit connections requisite to effect stepping or shifting of the discharge are a minimum.

The invention and the above-noted and other features thereof will be understood more clearly and fully from the following detailed description with reference to the accompanying drawings in which:

Figs. 8 and 9 are graphs showing typical performance characteristics of a device of the general construction illustrated in Figs. 1 and 2;

Fig. 10 is a circuit schematic illustrating one manner in which the device shown in Figs. 1 and 2 may be utilized for the counting of pulses;

Fig. 11 is in part a diagram and in part a circuit schematic showing one manner in which a device of the type illustrated in Figs. 1 and 2 may be utilized in a switching system for selectively closing a series of output or work circuits associated individually with certain of the cathodes;

Figure 2:
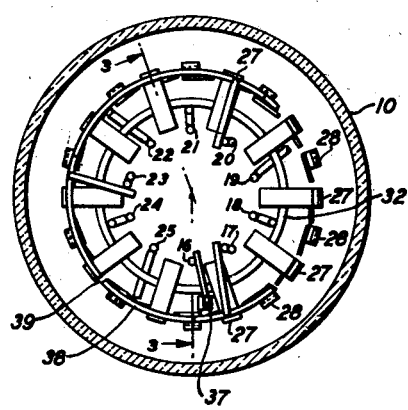
Fig. 2 is a sectional view taken along line 2—2 of Fig. 1 illustrating the arrangement of the several cathodes and the cooperative relation thereof with the anode, a portion of the anode being broken away to show certain of the cathodes more clearly.

Referring now to the drawings, the electric discharge device illustrated in Figs. 1 to 4 inclusive comprises a vitreous enclosing vessel 10 having therein a gaseous filling of a character hereinafter described and having also a dish-shaped stem 11. The vessel 10 is affixed to a base 12, which may be of generally conventional construction and is provided with a centering stud 13 and terminals 14 through which electric connection to the electrodes of the device may be established by way of leading-in conductors 15.

Sealed in the stem 11 are a plurality, ten in the specific embodiment illustrated, of rigid leading-in conductors 16 to 25 which are connected to the electrodes of the device, in the manner described hereinafter, by rigid connecting wires or links 26.

Figure 3:
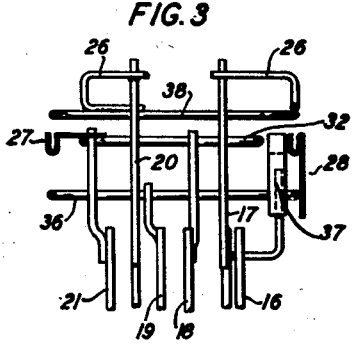
Fig. 3 is an elevational view in section taken along the line 3—3 of Fig. 2, of the anode and cathode assembly included in the device shown in Figs. 1 and 2.
Figure 1:
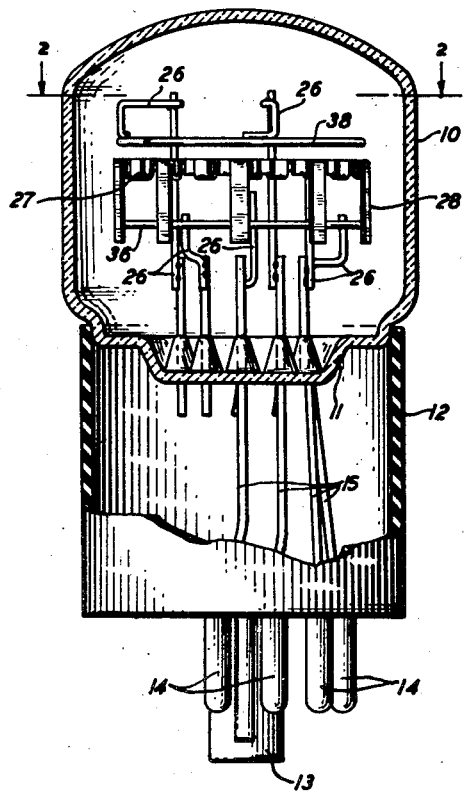
Fig. 1 is an elevational view of a multicold cathode glow discharge device illustrative of one embodiment of this invention, the enclosing vessel being shown in section and a portion of the base being broken away.
Figure 4B:
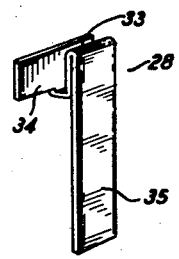
Figs. 4A and 4B are detail perspective views showing the construction of two forms of cathodes included in the device illustrated in Figs. 1 and 2.
Figure 4A:
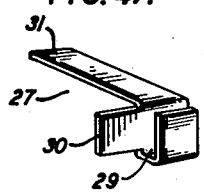

The electrodes of the device comprise a plurality of cathodes 27, hereinafter referred to as A cathodes, and a second plurality of cathodes 28, hereinafter designated as B cathodes, all of the cathodes being mounted in circular array with each A cathode interposed between two B cathodes 28. Each of the A cathodes, as illustrated clearly in Fig. 4A, comprises a channel-shaped portion 29, a plane tail portion 30 and a mounting portion 31. The mounting portions 31 are affixed to a metallic ring 32 which is affixed to and supported by the rigid leading-in conductors 18, 21 and 24. Each of the B cathodes, as illustrated in Fig. 4B, comprises a channel-shaped portion 33, a plane tail portion 34, and a mounting portion 35, the mounting portions being secured to a metallic ring 36 which is affixed to and supported by the leading-in conductors 19, 22 and 25. As illustrated in Figs. 1 and 3, the several cathodes are mounted with the channel portions in alignment along the circle of array and the tail portion of each cathode in juxtaposition to the channel portion of the next preceding cathode, viewed clockwise.

Supported by the leading-in conductor 16 is an auxiliary or reset cathode 37 which has a generally radially extending channel-shaped portion in juxtaposition to the tail portion 30 of the A cathode 27 nearest thereto as shown in Fig. 1.

A ring-shaped anode 38 is supported opposite the channel portions of the A and B cathodes and coaxial therewith by the leading-in conductors 17, 20 and 23. Advantageously, as illustrated in Fig. 2, the anode is provided with a break or slot 39, to facilitate outgassing of the cathodes by induction heating without overheating of the anode.

In a specific and illustrative device, the channel in each of the A and B cathodes may be .020 inch wide, $\frac{1}{16}$ inch deep and $\frac{1}{16}$ inch long and the tail portions 30 and 34 may be $\frac{1}{16}$ inch long and $\frac{1}{16}$ inch wide. The cathodes may be formed of refractory metal, for example .010 sheet molybdenum. Other metals, such as tantalum and columbium also may be utilized for the cathode material. The A and B cathodes may be mounted so that the tail portion 30 or 34 of each is spaced .030 inch from the nearest edge of the next preceding cathode. The anode may be of .020 diameter molybdenum wire and spaced from the cathodes to define a gap of .050 inch measured from the upper edge of the cathodes. The gas within the envelope 10 may be neon at a pressure of 50 millimeters of mercury or hydrogen at a pressure of 20 millimeters of mercury. Other gases, such as for example, argon, krypton, helium, xenon, or mixtures of these also may be used. The auxiliary cathode also may be formed of sheet refractory metal, such as molybdenum, and the channel portion thereof may be spaced .020 inch from the A cathode nearest thereto.

Figure 5:
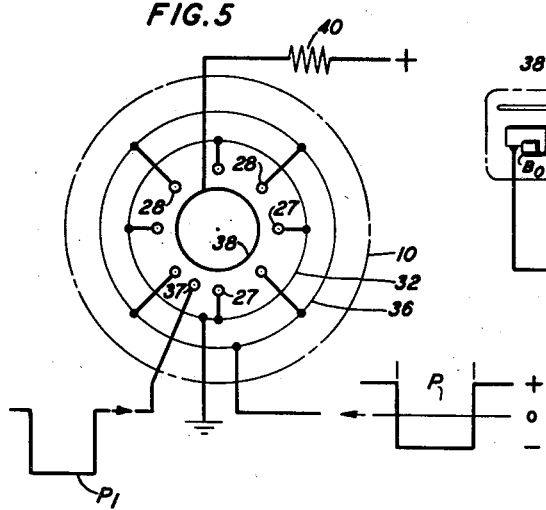
Fig. 5 is a circuit schematic illustrating one manner in which the device of Figs. 1 and 2 may be operated.
Figure 6:
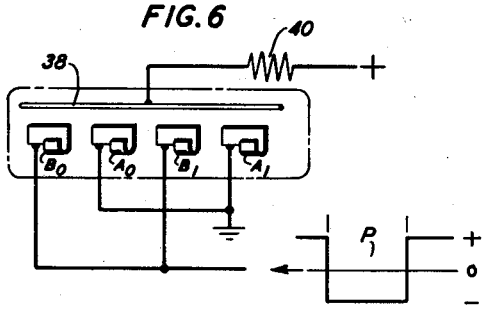
Fig. 6 is a diagram illustrating certain principles involved in the operation of the device.

The basic operation of the device may be understood by reference to Figs. 5 and 6. In both of these figures, the number of cathodes shown has been reduced from the number included in the device illustrated in Figs. 1 to 4 for the sake of simplicity of illustration. The principles of operation involved are independent of the number of cathodes, it being understood that a greater or lesser number than shown in the particular device heretofore described may be employed. As shown in Fig. 5, the A cathodes are connected together and to ground; the B cathodes are connected together electrically and to a suitable source for applying thereto a negative pulse which may be of the general form indicated at P. The anode 38 is maintained at a positive potential relative to ground below the breakdown voltage of the cathode-to-anode gaps but sufficient to sustain a discharge between any cathode and the anode. A load resistor 40 is connected to the anode in series with the biasing source, as shown. The auxiliary cathode 37 has applied thereto pulses of the general form indicated at $P_1$.

Referring now to Fig. 6, assume that a discharge obtains between one of the cathodes, say $A_0$, and the anode 38. The channel-shaped portion of the cathode is much more efficient as a glow discharge element than the plane tail portion. Consequently, the discharge between the cathode $A_0$ and the anode 38 will concentrate at the channel portion of this cathode. Thus, it will be appreciated that with a discharge obtaining between the cathode $A_0$ and the anode 38, the tail portion of the next succeeding cathode $B_1$ extends into a region of high ionization density whereas the next preceding cathode $B_0$ is located in a region of low ionization density. Consequently, if a pulse, indicated at P in Fig. 6, is applied to the cathodes $B_0$ and $B_1$, the discharge will transfer initially from the cathode $A_0$ to the cathode $B_1$ and will concentrate at the channel portion of the cathode $B_1$. At the cessation of the pulse, the discharge will transfer to the cathode $A_1$ and concentrate at the channel-shaped portion thereof. Thus, in a device such as is illustrated in Fig. 5, successive pulses P will effect transfer of the discharge from an A cathode to the next succeeding A cathode.

Figure 7:
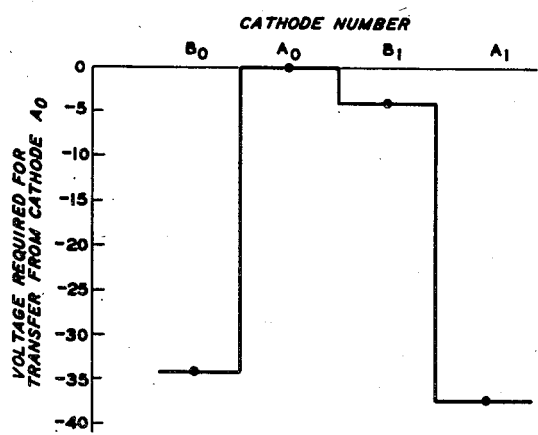
Fig. 7 is a diagram illustrating certain principles involved in the selective direction of stepping of the discharge in the device.

Because of the configuration of the cathodes and the difference heretofore pointed out in the ionization densities at the regions of the two cathodes on opposite sides of any cathode to which a discharge obtains, it will be noted that the discharge will be transferred or shifted in the same direction, for example, counter-clockwise around the cathodes in Fig. 5. This feature, which may be considered as a preference mechanism, is illustrated quantitively in Fig. 7. As shown in this figure, with a discharge obtaining between the cathode $A_0$ and the anode 38, a voltage upon the cathode $B_0$ of the order of 34.5 volts is necessary to effect transfer of the discharge to the cathode $B_0$, whereas a voltage of only about 4.5 volts is necessary to effect transfer of the discharge from cathode $A_0$ to cathode $B_1$.

Once the discharge reaches any A cathode it will remain at that cathode until the next succeeding pulse thereby closing the circuit from that cathode through the load resistor 40. The discharge may be reset or returned from any of the A cathodes to the auxiliary or reset cathode 37 by the application of a strong negative pulse $P_1$ to the auxiliary or reset cathode 37. It will be understood that the negative pulse P and the load resistor 40 should be correlated so that when the discharge is shifted from an A cathode to a B cathode, the increased voltage drop in the load resistor is sufficient to cause the voltage between the anode and the A cathode to fall below the sustaining value, whereby the discharge to the A cathode from which the discharge is stepped or shifted will be extinguished.

It has been found that the shape of the input pulses and the time between pulses are not critical. Sine wave form, rectangular and exponential pulses have been utilized successfully. However, because of the deionization time factor a minimum pulse length and a minimum period between pulses are required to prevent false operation. This may be understood from a consideration of Fig. 6. Assume that the discharge has been transferred from the cathode $A_0$ to the cathode $B_1$ in the manner described hereinabove. Some ionization may remain in the vicinity of the cathode $A_0$. If the pulse is released before deionization occurs in the gap between cathode $A_0$ and the anode 38, the discharge may transfer, upon cessation of the pulse, from the cathode $B_1$ back to the cathode $A_0$. The particular pulse length and deionization period required will be dependent, of course, upon the particular gas employed that the pressure thereof. In typical devices of the construction described hereinabove, wherein the gas was neon at a pressure of 50 millimeters of mercury, operation has been found satisfactory with sine wave pulses at frequencies up to 1300 cycles per second corresponding to approximately 0.4 millisecond pulse duration. In other such devices wherein the gas was hydrogen at a pressure of 20 millimeters of mercury, operation at frequencies of the order of 60,000 cycles per second has been attained corresponding to pulse lengths of approximately 8 microseconds.

As has been mentioned heretofore, the beam may be reset from any A cathode to the auxiliary cathode 37 by application of a negative pulse to the auxiliary cathode 37. If the cathode nearest and succeeding the auxiliary cathode 37 is an A cathode 27 at ground potential, upon cessation of the negative pulse applied to the cathode 37, the discharge will transfer to this next adjacent A cathode. As will be pointed out hereinafter, the auxiliary or reset cathode may be so positioned that upon termination of the reset pulse the discharge remains upon this cathode.

Figure 8:
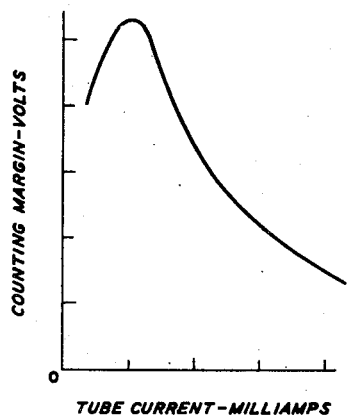

As has been pointed out heretofore, the preference feature whereby the discharge is stepped always in one direction in response to signal pulses applied to the B cathodes results from the large difference in the voltages required to transfer the discharge from any cathode to the next preceding or next succeeding cathode. This difference, about 30 volts for the case depicted in Fig. 7, may be designated as the counting margin and is dependent upon the cathode geometry and the gas filling, and also upon the anode current. The general relationship between the counting margin and the anode current is indicated in Fig. 8 from which it will be noted that there is a current for which the counting margin is the maximum or optimum.

In some applications of devices constructed in accordance with this invention, as will be indicated hereinafter, individual output or load circuits may be associated with the A cathodes. In the operation of such devices, as a result of the voltage developed across any load, the A cathode associated with that load becomes negative with respect to all other A cathodes. Thus, the maximum permissible voltage which can be developed across a load is limited by the tendency of the discharge to transfer to the next succeeding or next preceding A cathode. This limiting load voltage may be designated as the output voltage margin and is a function of the cathode geometry, the gas filling and the operating current. Further, it is dependent upon the voltage of the B cathodes during the interval between the applied pulses. The general relationship between output voltage margin and tube current for two different return voltages for the B cathodes is illustrated in Fig. 9. In this figure, curve X portrays the relationship for the condition of the B cathodes held at 45 volts positive relative to the A cathodes between signal pulses and curve Y depicts the relationship with the B cathodes floating.

Devices constructed in accordance with this invention may be used as counters of signal pulses. One system involving such use is illustrated in Fig. 10 including a device having twenty cathodes in addition to the auxiliary or reset cathode 37 and, therefore, having ten pulse positions. The system includes two switches $S_1$ and $S_2$ each having two positions, designated 1 and 2, the two switches being connected to operate simultaneously. With the switches in position 1, input pulses are applied to the B cathodes 28 and the discharge is stepped counter-clockwise from the A cathode 27 immediately adjacent the reset or auxiliary cathode 37, one position for each input pulse. At the end of a prescribed period the switches are thrown to position 2. Stepping pulses are then applied from a reading device to the B cathodes until the discharge is stepped or returned to the auxiliary cathode 37. When the discharge reaches this position, a positive output pulse is supplied to the reading device. The number of pulses supplied via switch $S_1$ in position 2 are counted and the difference between this number of pulses and the positions in the device indicates or measures the number of pulses applied over switch 1 while it was in position 1. A biasing source in series with a resistor 42 is arranged to be connected to the auxiliary cathode 37 when the switch $S_2$ is in position 2. The resistor 42 may be made so small and the voltage of source 41 sufficiently negative that once the discharge is returned to the auxiliary cathode 37 it will remain there even though pulses are applied over switch $S_1$ in position 2.

It will be noted that if in a system as shown in Fig. 10, the switch $S_1$ is kept in position 1 and switch $S_2$ is maintained in position 2, one output pulse will be obtained for each ten input pulses. Thus, the device will function as a frequency divider. Also it will be appreciated that a device thus operated may be utilized as a computer, particularly as a decimal counter with a pulse produced at the ten position.

Devices constructed in accordance with this invention may be employed advantageously to effect operation of any one of a number of circuits in accordance with the number of input pulses applied to the device. One typical arrangement is illustrated in Fig. 11. As therein shown, each A cathode 27 is provided with a separate leading-in conductor and has connected therewith a relay 43 for controlling an associated work circuit. The anode 38 is connected to the positive source through a pair of resistors 44 and 45, one of which is arranged to be short-circuited by a switch 46. Advantageously, in one manner of operation, the resistors 44 and 45 are made large so that the current through any relay is limited to a value below the operate value.

In the operation of the device of Fig. 11, a pulse P1 applied to the resistor 47 establishes a discharge between the anode 38 and the auxiliary cathode 37. Each input pulse P applied to the B cathode 28 results in stepping of the beam one position, that is to the A cathodes 27 in sequence. When, for example, at the end of a prescribed period of time, the switch 46 is closed a current sufficiently large to effect operation of the relays 43 flows over the circuit including the anode 38 and the A cathode to which the discharge has been stepped. Thus, by controlling the number of input pulses per unit of time during which the switch 46 is open and then closing the switch 46 selective operation of the load circuits controlled by the relays 43 in accordance with the number of pulses may be effected.

It will be noted that in the arrangement illustrated in Fig. 11, the cathode next succeeding and nearest the auxiliary cathode 37 is the B cathode 28. If the normal potential of the B cathodes 28 is such that these cathodes are positive relative to the auxiliary or reset cathode 37, when the discharge is reset to the auxiliary cathode 37 it will remain thereon even upon cessation of the reset pulse. Thus, the first input pulse applied to the B cathodes 28 will effect transfer of the discharge from the auxiliary cathode 37 to the first succeeding A cathode 27.

Figure 12:
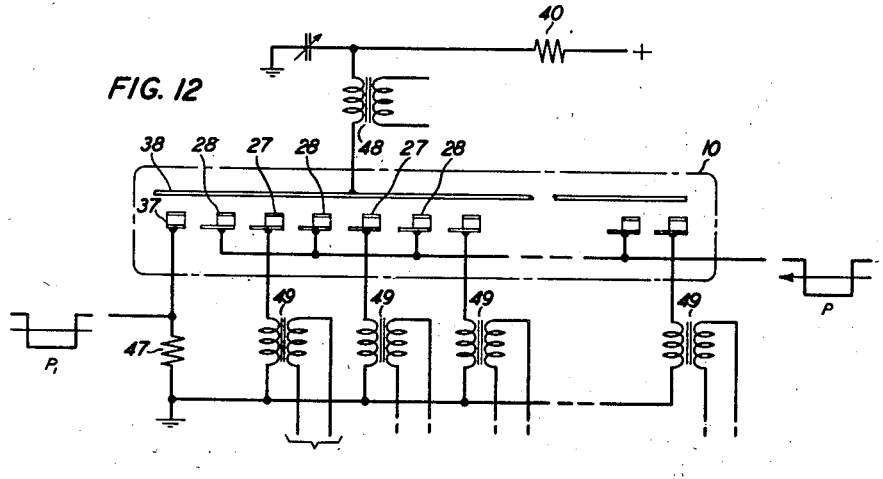
Fig. 12 illustrates one manner in which a device constructed in accordance with this invention may be utilized for the selective association of any one of a number of signal transmitting circuits with another circuit.

Devices constructed in accordance with this invention may be utilized advantageously also as switches, for example, to selectively connect individual telephone subscriber's lines to a common line, as illustrated in Fig. 12. As shown in this figure, the anode circuit includes an audio transformer 48, and each of the A cathodes 27 includes an audio transformer 49. The discharge is stepped from the auxiliary cathode 37 in response to input pulses so that it comes to rest upon the A cathode 27 corresponding to the number of input pulses and a two-way talking path is completed over this cathode and the anode 38 between the corresponding transformer 49 and the transformer 48.

Advantageously, in the construction of a device to define individual talking paths as illustrated in Fig. 12, the parameters entering into the determination of the discharge are so related, in accordance with the principles disclosed in the application, Serial No. 17,522 filed March 27, 1948 of W. A. Depp, issued on May 17, 1950 as Patent No. 2,507,696, that the several discharge paths are free of oscillatory noise whereby faithful transmission of audio signals over the talking paths is realized.

Figure 13:
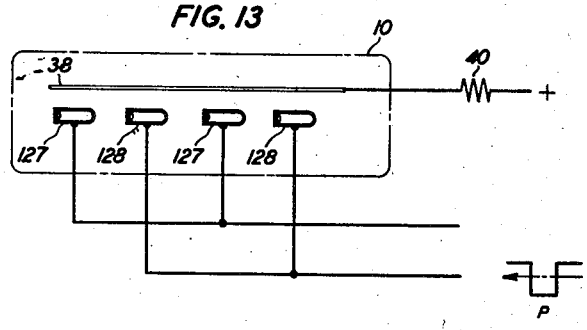
Fig. 13 illustrates diagrammatically another embodiment of this invention wherein the selective direction of transfer of the discharge is realized by a particular form and arrangement of cylindrical cathodes.

In another embodiment of this invention illustrated in Fig. 13, the preferential operation resulting in transfer of the discharge only in the prescribed direction from cathode to cathode is realized by constructing the A and B cathodes 127 and 128 as cylinders closed at one end and open at the other. The open end of each cylindrical cathode is in juxtaposition to the closed end of the next succeeding cathode, that is, the cathode next to the right in Fig. 13. When any cathode is energized to establish a discharge between it and the anode 38, the glow discharge concentrates near the open end of that cathode. Thus, transfer may be effected readily from the open end of one cathode to the next succeeding cathode at a relatively low voltage whereas transfer from any such cathode to the next preceding cathode can be effected only with great difficulty and by the use of much higher voltages.

Figure 14:
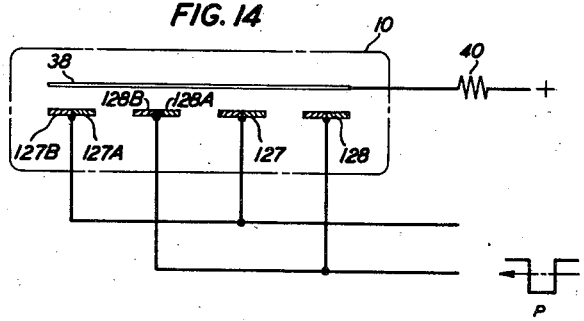
Fig. 14 illustrates another embodiment of this invention wherein shifting of the discharge in the prescribed direction is realized by a particular construction of the individual cathodes.

In still another embodiment of this invention illustrated in Fig. 14, the preference feature is realized by constructing each cathode of two parts 127A and 127B or 128A and 128B having different efficiencies as glow discharge cathodes. In the construction illustrated in Fig. 14, the right-hand portions of the cathodes, that is 127A and 128A, are made of a material having a higher glow discharge efficiency than the left-hand parts 127B and 128B. In specific and illustrative constructions the parts 127A and 128A may be of molybdenum, glow voltage in argon approximately 100 volts, and the parts 127B and 128B may be of copper, glow voltage in argon approximately 140 volts, or the parts 127A and 128A may be of columbium, glow voltage in argon approximately 96 volts, and the parts 127B and 128B may be of molybdenum. Thus, in response to the application of signal pulses to the B cathodes 128 the discharge will be transferred to the right in Fig. 14 in the same manner as described in detail hereinabove in connection with the device illustrated in Figs. 1 to 4.

Although specific embodiments of this invention have been shown and described, it will be understood that they are but illustrative and that various modifications may be made therein without departing from the scope and spirit of this invention.

What is claimed is:

1. A gaseous discharge device comprising a plurality of cathodes each having two portions of different efficiency as glow discharge elements, the portion of greater efficiency of each cathode being opposite the next succeeding cathode and the portion of lesser efficiency being toward the next preceding cathode, and an anode opposite said cathodes.

2. A glow discharge device comprising a row of cathodes each having a hollow portion and a plane portion, the hollow portion of each cathode being opposite the plane portion of the next succeeding cathode, and an anode opposite said cathodes.

3. A glow discharge device comprising a plurality of cathodes mounted in a row, each cathode having a channel portion extending in the direction of said row and a tail portion extending from the channel portion, said cathodes being arranged with the channel portion of each opposite the tail portion of the next succeeding cathode, and an anode opposite said cathodes.

4. A glow discharge device comprising a plurality of cathodes mounted in a circular row and each having two portions of different efficiency as glow discharge elements, the portion of greater efficiency of each cathode being in juxtaposition to the portion of lesser efficiency of the next succeeding cathode in said row, and an annular anode opposite said cathodes and substantially coaxial therewith.

5. A glow discharge device comprising a plurality of refractory metal cathodes mounted in a circular row and each having a channel portion extending in the direction of said row and a tail portion extending from the channel portion and in the direction of said row, the open face of the channel portions facing in the same direction and the channel portion of each cathode being in juxtaposition to the tail portion of the next succeeding cathode, and an annular anode substantially coaxial with said cathodes, opposite the open faces of said channel portions and uniformly spaced therefrom.

6. A gaseous discharge device comprising a plurality of hollow cathodes each closed at one end and open at the other, said cathodes being mounted with the open end of each facing toward the closed end of the next succeeding cathode, and an anode adjacent said cathodes.

7. A glow discharge device comprising a plurality of cylindrical cathodes each open at one end and closed at the other, said cathodes being mounted in a row with the open end of each in juxtaposition to and aligned with the closed end of the next succeeding cathode in the row, and an anode opposite said cathodes.

8. A gaseous discharge device comprising a plurality of cathodes each having two portions of different materials having different glow discharge voltages, said cathodes being mounted with the portion of each of the lower glow discharge voltage material opposite the portion of the next succeeding cathode of the higher glow discharge material, and an anode opposite said cathodes.

9. A gaseous discharge device in accordance with claim 8 wherein the portions of lower discharge voltage are of molybdenum.

10. A glow discharge device comprising a plurality of substantially coplanar cold cathodes each having its opposite end portions of materials having different glow discharge voltages, said cathodes being mounted in a row in end-to-end relation with the end portion of lower glow discharge voltage of each cathode in juxtaposition to the end portion of higher glow discharge voltage of the next succeeding ctahode, and an anode opposite said cathodes.

11. A gaseous discharge device comprising a plurality of cathodes each having two portions of different efficiency as glow discharge elements, the portion of greater efficiency of each cathode being opposite the next succeeding cathode and the portion of lesser efficiency being toward the next preceding cathode, an anode opposite said cathodes, and an auxiliary cathode adjacent one of said plurality of cathodes.

12. A glow discharge device comprising a row of cathodes each having a hollow portion and a plane portion, the hollow portion of each cathode being opposite the plane portion of the next succeeding cathode, an anode opposite said cathodes, and an auxiliary cathode in juxtaposition to the plane portion of one of said row of cathodes.

13. A glow discharge device comprising a plurality of refractory metal cathodes mounted in a row, each cathode having a channel portion extending in the direction of said row and a tail portion extending from the channel portion, said cathodes being arranged with the channel portion of each opposite the tail portion of the next succeeding cathode, an anode opposite said cathodes, and an auxiliary cathode having a channel portion in juxtaposition to one of said plurality of cathodes.

14. A gaseous discharge device comprising a series of cathodes each having two portions of different efficiency as glow discharge elements, said cathodes being mounted with the portion of higher efficiency of each cathode in juxtaposition to the portion of lower efficiency of the next succeeding cathode, an anode opposite said cathodes, means connecting one group of non-adjacent cathodes together, and means for applying signal pulses to certain other of said cathodes.

15. A gaseous discharge device comprising a row of cathodes each having two parts of different efficiency as glow discharge elements, said cathodes being mounted with the more efficient portion of each opposite the less efficient portion of the next succeeding cathode, an anode opposite said cathodes, means electrically connecting one group of alternate cathodes together, and means for applying signal pulses between said one group and the remainder of said cathodes.

16. A gaseous discharge device comprising a plurality of refractory metal cold cathodes each having a channel portion and a tail portion, said cathodes being mounted in a row with the channel portion of each in juxtaposition to the tail portion of the next succeeding cathode, an anode opposite said cathodes, means electrically connecting one group of alternate cathodes together, and means for applying signal pulses between said one group and other of said cathodes.

17. A gaseous discharge device comprising a series of cathodes each having two portions of different efficiency as glow discharge elements, said cathodes being mounted with the portion of higher efficiency of each cathode in juxtaposition to the portion of lower efficiency of the next succeeding cathode, an anode opposite said cathodes, means connecting one group of non-adjacent cathodes together, means for applying signal pulses to certain other of said cathodes, an auxiliary cathode adjacent one of said series of cathodes, and means for applying signal pulses to said auxiliary cathode.

18. A gaseous discharge device comprising a plurality of refractory metal cold cathodes each having a channel portion and a tail portion, said cathodes being mounted in a row with the channel portion of each in juxtaposition to the tail portion of the next succeeding cathode, an anode opposite said cathodes, means electrically connecting one group of alternate cathodes together, means for applying signal pulses between said one group and other of said cathodes, an auxiliary cathode having a channel portion in juxtaposition to one of said plurality of cathodes, and means for applying signal pulses to said auxiliary cathode.

19. A gaseous discharge device comprising a plurality of glow cathodes each cathode having two portions of different glow discharge voltage and said cathodes being arranged with the portion of greater glow discharge voltage of each opposite the portion of smaller glow discharge voltage of the next succeeding cathode, an anode adjacent said cathodes, means electrically connecting one group of alternate cathodes together, and means electrically connecting the other group of alternate cathodes together.

20. A gaseous discharge device comprising a plurality of glow cathodes each having a channel portion and a tail portior, said cathodes being mounted in a row with the channel portion of each in juxtaposition to the tail portion of the next succeeding cathode, means electrically connecting one group of alternate cathodes together, means electrically connecting the other group of alternate cathodes together, and means for impressing signal pulses between said one and other groups.

21. An electric discharge device comprising an enclosing vessel having a gaseous filling, a plurality of cathodes each having two portions of different glow discharge efficiency, said cathodes being mounted in a circular row with the portion of greater efficiency of each in juxtaposition to the portion of lesser efficiency of the next succeeding cathode, a pair of conductive rings mounted in said enclosing vessel, each group of alternate cathodes being electrically connected to and supported by a respective one of said rings, and an anode opposite said cathodes.

22. An electric discharge device comprising an enclosing vessel having a gaseous filling, a plurality of cathodes arranged in a circular row, each cathode having a channel portion and a tail portion both extending substantially in the direction of said row and said cathodes being disposed with the channel portion of each in juxtaposition to the tail portion of the next succeeding cathode, each cathode having also a mounting portion, a pair of metallic rings mounted within said vessel, the mounting portions of one group of alternate cathodes being affixed to one of said rings and the mounting portions of the other group of alternate cathodes being affixed to the other of said rings, and an annular anode opposite said cathodes and substantially coaxial with said row.

23. A gaseous discharge device comprising a plurality of cathodes each having two portions of different efficiency as glow discharge elements, said cathodes being mounted in a row with the portion of higher efficiency of each cathode opposite the portion of lower efficiency of the next succeeding cathode, an anode opposite said cathodes, individual load circuits connected to certain of said cathodes spaced along said row, and means for impressing signal pulses between said certain cathodes and other of said cathodes to effect stepping of the discharge between said anode and any of said certain cathodes to the next succeeding one of said certain cathodes.

24. A gaseous discharge device comprising a plurality of cathodes each having two portions of different efficiency as glow discharge elements, said cathodes being mounted in a row with the portion of higher efficiency of each cathode opposite the portion of lower efficiency of the next succeeding cathode, an anode opposite said cathodes, means electrically connecting one group of said cathodes together, individual load circuits connected to certain other of said cathodes, and means for effecting stepping of the discharge between said anode and individual cathodes along said row.

25. A gaseous discharge device comprising a plurality of cathodes each having two portions of different efficiency as glow discharge elements, said cathodes being mounted in a row with the portion of higher efficiency of each cathode opposite the portion of lower efficiency of the next succeeding cathode, an anode opposite said cathodes, means electrically connecting one group of alternate cathodes together, individual load circuits connected to the other alternate cathodes, and means for applying signal pulses to said one group of cathodes to step the discharge between said anode and individual cathodes along the row of cathodes.

26. A gaseous discharge device comprising a plurality of cathodes each having two portions of different efficiency as glow discharge elements, said cathodes being mounted in a row with the portion of higher efficiency of each cathode opposite the portion of lower efficiency of the next succeeding cathode, an anode opposite said cathodes, an auxiliary cathode adjacent one of said plurality of cathodes, individual load circuits connected to certain of said plurality of cathodes, means for energizing said auxiliary cathode to establish a discharge between it and said anode, and means for energizing said plurality of cathodes to effect stepping of the discharge along said row.

27. A gaseous discharge device comprising a plurality of cathodes each having two portions of different efficiency as glow discharge elements, said cathodes being mounted in a row with the portion of higher efficiency of each cathode opposite the portion of lower efficiency of the next succeeding cathode, an anode opposite said cathodes, individual load circuits connected to certain of said cathodes spaced along said row, each of said load circuits including a current responsive device requiring at least a minimum current to operate, means biasing said anode relative to said cathodes at a potential sufficient to sustain a discharge between said anode and any cathode but insufficient to initiate such discharge, the anode biasing circuit including means for limiting the current through said load circuits to a value below said minimum current, means for energizing said cathodes to initiate a discharge between one cathode and step the discharge along said row, and means for disabling said current limiting means.

28. A gaseous discharge device comprising a plurality of cathodes each having two portions of different efficiency as glow discharge elements, said cathodes being mounted in a row with the portion of higher efficiency of each cathode opposite the portion of lower efficiency of the next succeeding cathode, an anode opposite said cathodes, individual load circuits connected to certain of said cathodes spaced along said row, each of said load circuits including a current responsive device requiring at least a minimum current to operate, means biasing said anode relative to said cathodes at a potential sufficient to sustain a discharge between said anode and any cathode but insufficient to initiate such discharge, the anode biasing circuit including resistance of normal magnitude sufficient to limit the discharge current through said load circuits to a value below said minimum current, means electrically connecting together other of said cathodes each adjacent a respective one of said certain cathodes, means for applying signal pulses to said other cathodes to initiate discharges therebetween and said anode, and means for reducing the magnitude of said resistance to increase the current through said circuits to above said minimum current.

29. A gaseous discharge device comprising a plurality of cathodes each having a channel portion and a tail portion, said cathodes being mounted in a row with the channel portion of each opposite the tail portion of the next succeeding cathode, an auxiliary cathode adjacent one of said plurality of cathodes, an anode opposite all of the cathodes, means biasing said anode at a potential below the breakdown voltage of the anode-cathode gaps but sufficient to sustain a discharge across said gaps, the biasing circuit including resistance to limit the current across any anode-cathode gap to below a preassigned value, means connecting one group of alternate cathodes in said row together electrically, individual load circuits connected to the other alternate cathodes in said row and each including a current responsive device operable only upon flow of current of greater than said preassigned value therethrough, means for energizing said auxiliary cathode to establish a discharge between it and said anode, means for applying signal pulses to said group of alternate cathodes to step the discharge along said row of cathodes, and means for short-circuiting at least a portion of said resistance thereby to increase the current to the current responsive devices to above said preassigned value.

30. A gaseous discharge device comprising a first plurality of cathodes mounted in a row, an anode opposite said cathodes, a plurality of signal transmission channels each including a respective one of said cathodes and said anode, means biasing said anode at a potential relative to said cathodes below the breakdown potential of the cathode-anode gaps but sufficient to sustain a discharge across any of said gaps, and means for selectively establishing a discharge across any of said gaps thereby to close the signal channel associated with that gap, including a second plurality of cathodes each between a respective pair of said first cathodes, means electrically connecting said second cathodes together, means for applying signal pulses to said second cathodes to establish a potential therebetween and said anode adequate to support a discharge, and means for initiating a discharge between said anode and one of said second cathodes.

31. A glow discharge device comprising a first group of cathodes mounted in a closed path, an anode opposite said cathodes, individual load circuits connected to said cathodes, means biasing said anode at a potential between the sustaining and breakdown potentials of the anode-cathode gaps, an auxiliary cathode adjacent said path, means for establishing a discharge between said anode and said auxiliary cathode, and means for stepping the discharge in one direction along said path to successive cathodes of said first group in accordance with signal pulses, the discharge advancing from one cathode to the next succeeding one for each pulse, said stepping means including a second group of cathodes mounted along said path and each positioned between two respective cathodes of said first group, and means for applying said signal pulses to said second group of cathodes simultaneously, each of the cathodes in said first and second groups being of such form that the discharge thereat is concentrated at the portion thereof nearest the next succeeding cathode along said path.

32. A glow discharge device comprising two pairs of cathodes mounted in a row with the cathodes of the two pairs in alternate relation, an anode opposite and equally spaced from said cathodes, means biasing said anode relative to said cathodes at a potential between the sustaining and breakdown potentials of the anode-cathode gaps, one of said pairs being connected together electrically, means for initiating a discharge between said anode and one of the end cathodes in said row, and means for stepping the discharge along said row comprising means for pulsing said one pair of cathodes relative to the other pair.

33. A gaseous discharge device comprising an array of electrodes, at least one group of alternate electrodes being glow cathodes, an anode opposite said electrodes, said electrodes being constructed and arranged to provide substantial difference in the transfer characteristic from any electrode to two next adjacent electrodes, and means for stepping a discharge from any of said cathodes to a next adjacent cathode comprising means for applying negative pulses to the electrodes intermediate the electrodes of said one group.

34. An electric discharge device comprising an array of glow cathodes immersed in a gaseous atmosphere, an anode opposite said cathodes, said cathodes being constructed and arranged to provide asymmetry in transfer characteristics from any cathode to the two next adjacent cathodes, and means for effecting stepping of a discharge from any cathode to a prescribed one of the two next adjacent cathodes comprising means for applying signal pulses between two groups of alternate cathodes.

MARK A. TOWNSEND.

REFERENCES CITED

The following references are of record in the file of this patent:

UNITED STATES PATENTS

| Number | Name | Date |
|---|---|---|
| 2,184,756 | Rockwood, Jr. | Dec. 26, 1939 |
| 2,398,150 | Mumma et al. | Apr. 9, 1946 |
| 2,443,407 | Wales, Jr. | June 15, 1948 |
| 2,473,159 | Lyman, Jr. | June 14, 1949 |